United States Patent [19]
Yamaguchi

[11] Patent Number: 5,871,083
[45] Date of Patent: *Feb. 16, 1999

[54] HORIZONTAL CONVEY APPARATUS FOR A PALLET

[75] Inventor: Yoshiro Yamaguchi, Abiko, Japan

[73] Assignee: Nippon Filing Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,820,327.

[21] Appl. No.: 697,004

[22] Filed: Aug. 16, 1996

[30] Foreign Application Priority Data

Aug. 8, 1994 [JP] Japan .................................. 6-204155

[51] Int. Cl.⁶ .................................................. B65G 25/04
[52] U.S. Cl. ........................................... 198/772; 414/286
[58] Field of Search .................................. 414/267, 286, 414/276, 273; 198/772, 721

[56] References Cited

U.S. PATENT DOCUMENTS

| | | | |
|---|---|---|---|
| 3,512,630 | 5/1970 | Greenfield | 198/772 |
| 3,731,824 | 5/1973 | Howlett | 414/267 |
| 4,037,714 | 7/1977 | Koepke | 198/772 X |
| 4,200,421 | 4/1980 | Haldimann | 414/267 X |
| 4,282,970 | 8/1981 | Smock | 198/772 |
| 4,304,521 | 12/1981 | Hammond | 414/786 |
| 4,383,598 | 5/1983 | Newman | 414/276 X |
| 4,470,742 | 9/1984 | Schindler | 414/286 |
| 4,741,657 | 5/1988 | Cassel | 414/267 |
| 4,792,273 | 12/1988 | Specht | 414/286 X |
| 5,195,630 | 3/1993 | Donovan et al. | 198/772 X |

FOREIGN PATENT DOCUMENTS

| | | |
|---|---|---|
| 786661 | 6/1968 | Canada ................................ 414/286 |
| 2-300012 | 12/1990 | Japan . |
| 6-000566 | 1/1994 | Japan . |
| 7-232808 | 9/1995 | Japan . |
| 2507261 | 4/1996 | Japan . |
| 8-198409 | 8/1996 | Japan . |
| 8-198410 | 8/1996 | Japan . |

*Primary Examiner*—David A. Bucci
*Attorney, Agent, or Firm*—Joseph Scafetta, Jr.

[57] ABSTRACT

A horizontal conveying apparatus moves a pallet from an entrance port to an exit port, with either a load or an article placed on the pallet. The apparatus has fixed rails laid horizontally between the entrance port and the exit port, rails movable along the fixed rails, a plurality of load-conveying wheels/rollers disposed along the movable rails such that the wheels/rollers are rotatable with the pallet placed thereon, a drive device for reciprocally moving the movable rails, and a plurality of movement stopper pieces provided along the fixed rails, to engage with a bottom surface of the pallet and to hold the pallet as the movable rails move from the exit port back to the entrance port.

10 Claims, 13 Drawing Sheets

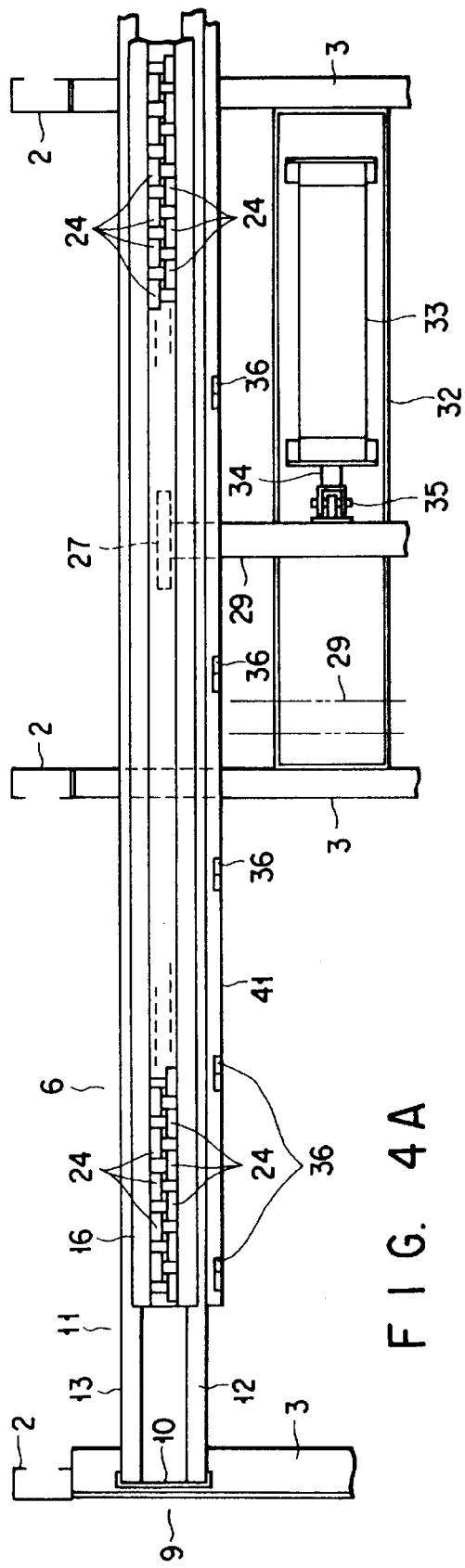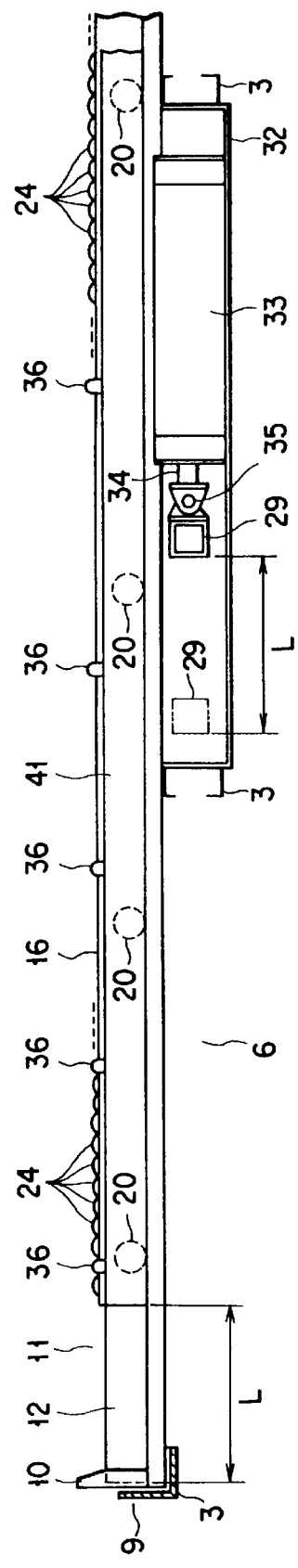
FIG. 4A
FIG. 4B

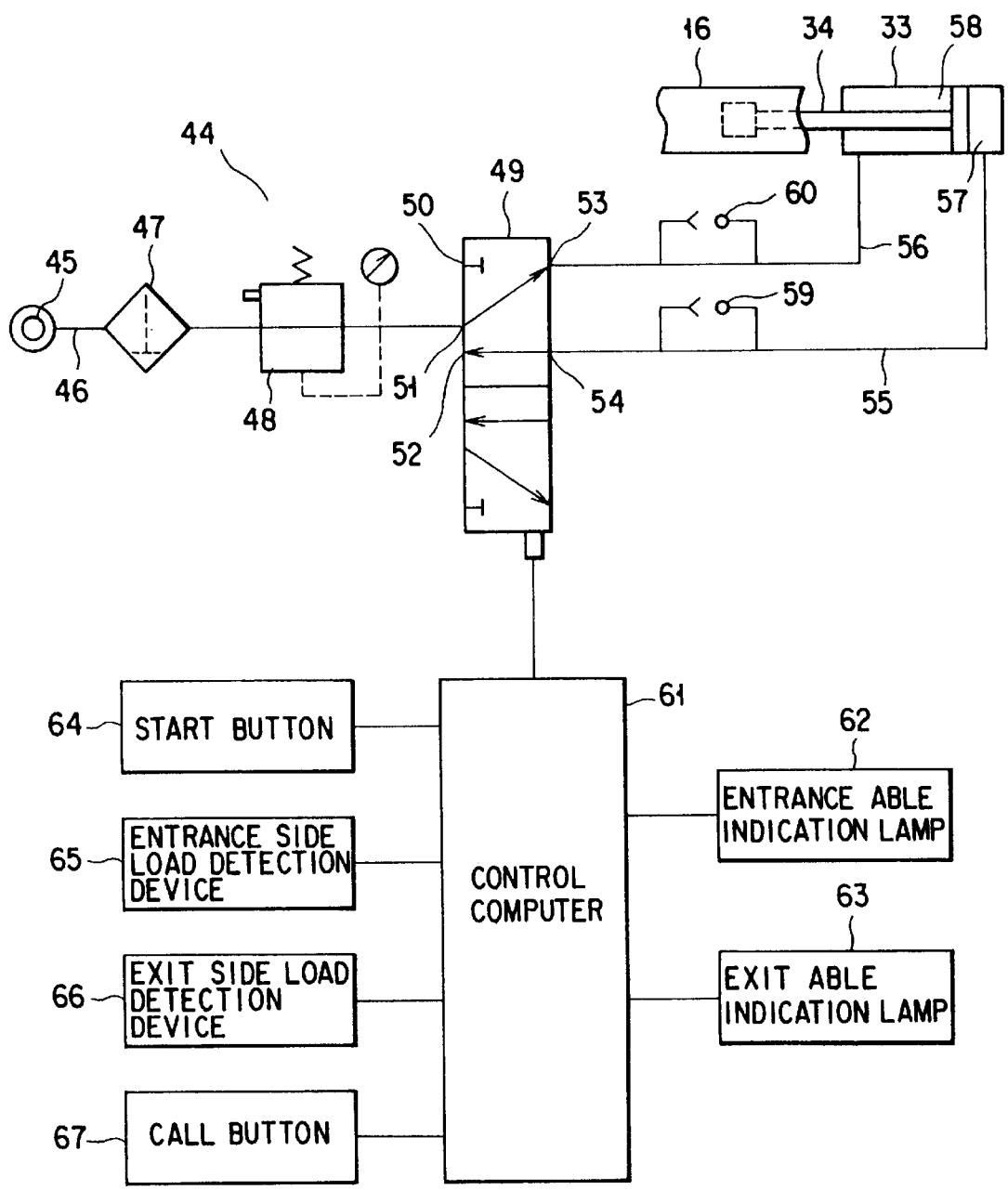
F I G. 11

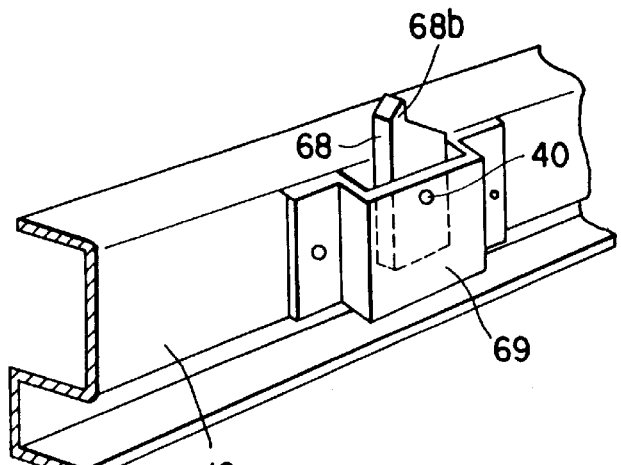
F I G. 13
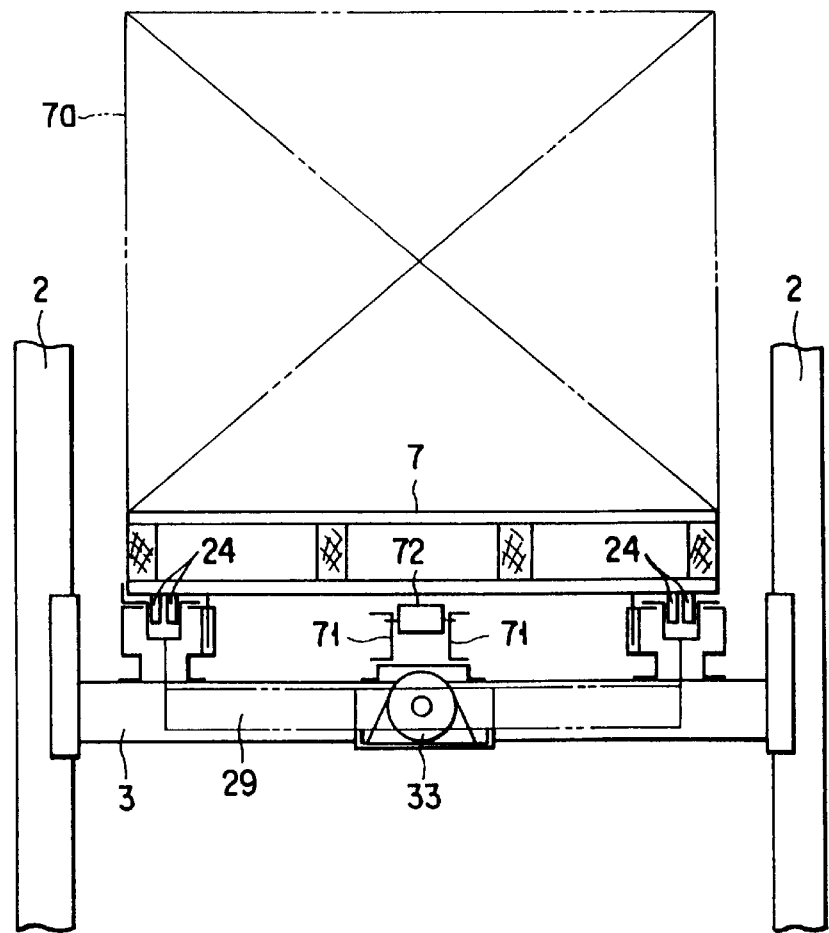
F I G. 16

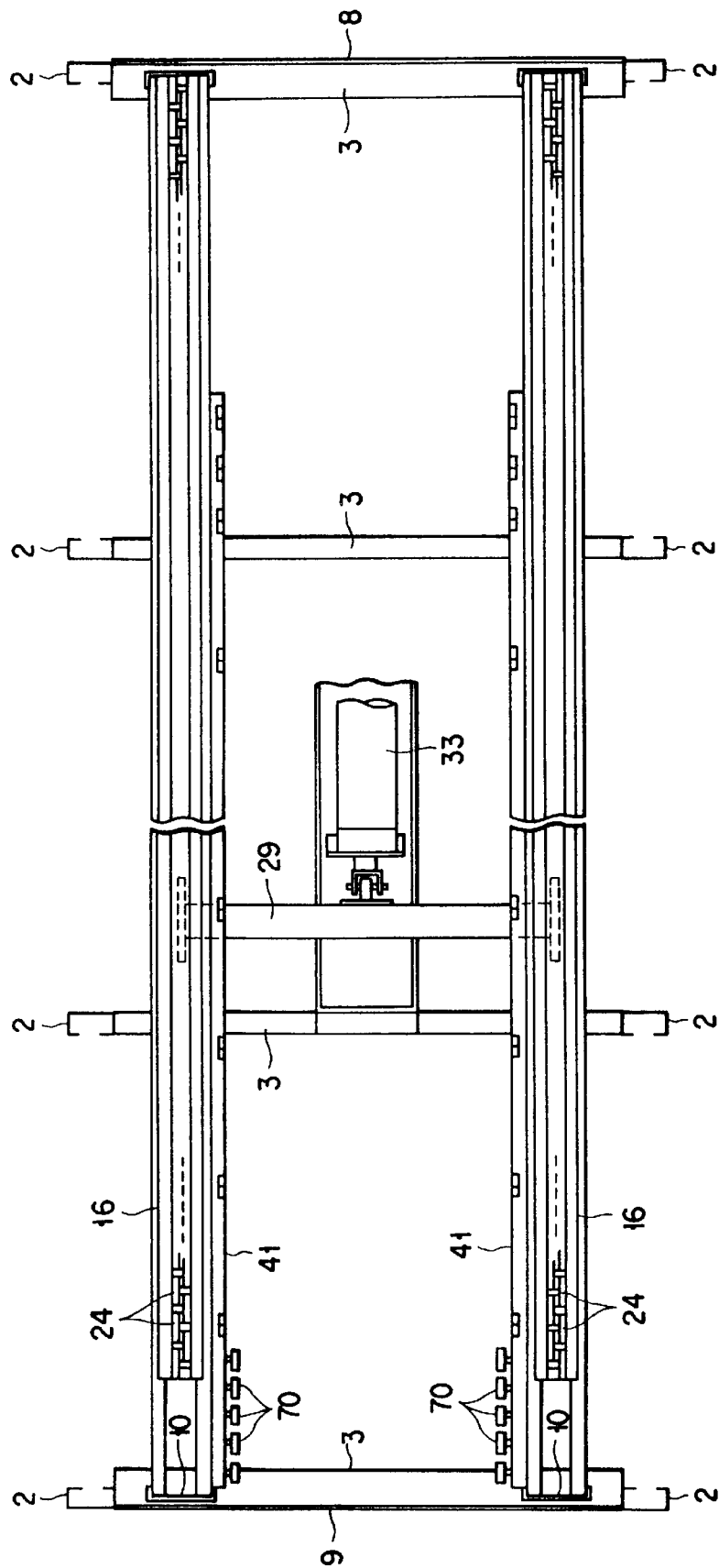

HORIZONTAL CONVEY APPARATUS FOR A PALLET

CROSS-REFERENCE TO RELATED APPLICATION

This application is related to Ser. No. 08/586,085 filed on Jan. 16, 1996, in the name of Yoshiro Yamaguchi et al. and assigned to the same assignee as this application.

BACKGROUND OF THE INVENTION

1. Field of the Invention

The present invention relates to a horizontal conveying apparatus such as a flow-through rack used for conveying a pallet in a horizontal direction from an entrance port thereof to an exit port thereof, with either a load or an article mounted on the pallet, and particularly, to an improvement in that the pallet is mounted on a rail laid in the horizontal direction and is conveyed intermittently along the rail.

2. Description of the Related Art

As is well known, in various stockrooms of production factories, flow-through racks are widely used. The flow-through rack is arranged so as to automatically and sequentially convey loads through an entrance port, provided at one end portion of the flow-through rack, to an exit port provided at another end portion of the flow-through rack, by means of a horizontal conveying apparatus. Therefore, it is possible to sequentially convey the loads out of the exit port, in the order in which the loads are conveyed from the entrance port.

A horizontal conveying apparatus generally used for this kind of flow-through rack is arranged such that a number of rollers are rotatably supported by a rail provided so as to move a load downwardly at an inclination from an entrance port to an exit port. Further, since loads are mounted on the rollers at the entrance port, the loads self-advance to the exit port, due to gravity, the inclination of the rail, and the rotation of the rollers.

However, in this general kind of horizontal conveyer, since the rail must be inclined to provide a gap between the entrance port and the exit port, there occurs a problem in that a dead space is created. This dead space is unnecessary for storing the loads. In addition, there occurs a problem in that it is not possible to avoid a variation in the moving speed, depending on the degree of the roughness of the bottom surfaces of the loads.

For example, a horizontal conveying apparatus which solves this kind of problem is disclosed in Japanese Patent Application (KOKAI) Publication No. 2-300,012. In the horizontal conveying apparatus shown in this example, at first, a lengthwise conveying member is horizontally extended from the entrance port of the loads to the exit port. This conveying member is supported so as to be reciprocally movable by a constant stroke in the lengthwise direction, with a load mounted thereon.

In addition, a lengthwise support member is provided in parallel with the conveying member. A plurality of stopper pieces are provided at constant intervals along the lengthwise direction. Each of these stopper pieces normally keeps a standing attitude such that these stopper pieces project upwardly, and each is arranged such that each of the stopper pieces falls down as the front side of the load pushes each stopper piece when each load moves from the entrance port to the exit port. Each stopper piece is engaged on the back side of each load when the loads are moved in the reverse direction.

Specifically, loads mounted on the conveying member are allowed to move without being stopped by stopper pieces when these loads are moved from the entrance port to the exit port. The loads are stopped by the stopper pieces and are prevented from moving when the loads are moved from the exit port to the entrance port. Therefore, the conveying member repeats reciprocal movements, thereby intermittently conveying the loads from the entrance port to the exit port.

According to the horizontal conveying apparatus shown in this prior art example, the conveying member can be placed horizontally without being inclined, so that it is possible to prevent occurrence of a dead space which is not directly necessary for storing the loads, like in a conventional apparatus. In addition, since loads are moved with themselves mounted on the conveying member, the moving speed can be kept constant regardless of the weights of the loads and the degree of the roughness of the bottom surfaces of the loads.

However, in the conventional horizontal conveying apparatus as described above, at the time when movement of a load mounted on the conveying member from the entrance port to the exit port is completed by one forward movement of the conveying member, there appears a distance between the back surface of the load mounted on the conveying member and the stopper piece which is closest to the back surface and is still standing, in a normal case.

Therefore, when a load is reversibly moved from the exit port to the entrance port due to a backward movement, the load can move back towards the entrance port together with the conveying member until the back surface of the load is brought into contact with and is stopped by a standing stopper piece. Specifically, the distance over which a load is conveyed by a forward movement of the conveying member is shortened, resulting in a problem that the efficiency of the conveying operation is deteriorated.

In addition, a load being moved toward the exit port is prevented from moving in the reverse direction since the back surface of the load is in contact with the stopper piece. Thereafter, the load is moved again toward the exit port, by the next forward movement of the conveying member. These conveying movements are repeated, and then, the loads are conveyed while being swung forwardly and backwardly in the conveying direction, resulting in a problem that the loads are either damaged or disarranged.

SUMMARY OF THE INVENTION

The present invention has been made in view of the above problem, and has an object of providing a horizontal conveying apparatus which is capable of conveying a load without wasteful movements, and is capable of conveying a load with safety ensured for the load.

According to one aspect of the present invention, there is provided a horizontal conveying apparatus for a pallet, comprising: fixed rails laid horizontally between an entrance port and an exit port; rails movable along the fixed rails; a plurality of load-conveying wheels/rollers disposed along the movable rails such that the wheels/rollers are rotatable with a pallet placed thereon; drive means for reciprocally moving the movable rails; and a plurality of movement stopper pieces provided along the fixed rails, to engage with a bottom surface of the pallet and to hold the pallet as the movable rails move from the exit port back to the entrance port.

According to the structure as described above, since a plurality of movement stopper pieces provided along fixed rails engage with a bottom surface of the pallet and hold the pallet as the movable rails move from the exit port back to the entrance port, reverse movement of the pallet from the exit port to the entrance port is securely prevented and pallets can be efficiently conveyed without waste, regardless of where on the movable rails the pallet sits. In addition, since pallets are not swung in the conveying direction, loads on the pallets can be prevented from being damaged or falling down, so that sufficient safety can be ensured for loads.

Additional objects and advantages of the invention will be set forth in the following description and will be clear therefrom, or may be learned by practice of the invention. The objects and advantages of the invention may be realized and obtained by the instrumentalities and combinations particularly pointed out.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 4A and 4B are a plan view and a side view, respectively, for explaining the entire structure of one rail device of the row;

FIG. 11 is a block diagram for explaining an air pressure control circuit in the horizontal flow-through rack;

FIG. 13 is a perspective view for explaining another example of the installation of the movement stopper piece on the rail device;

FIG. 14 is a plan view showing a state in which there is a plurality of auxiliary conveying wheels/rollers on the exit port side of a pair of rail devices in a modified embodiment;

FIG. 16 is a front view showing a state in which an intermediate rail having a support roller is provided between the pair of rail devices in the modified embodiment.

DETAILED DESCRIPTION OF THE PREFERRED EMBODIMENTS

Figure 1:
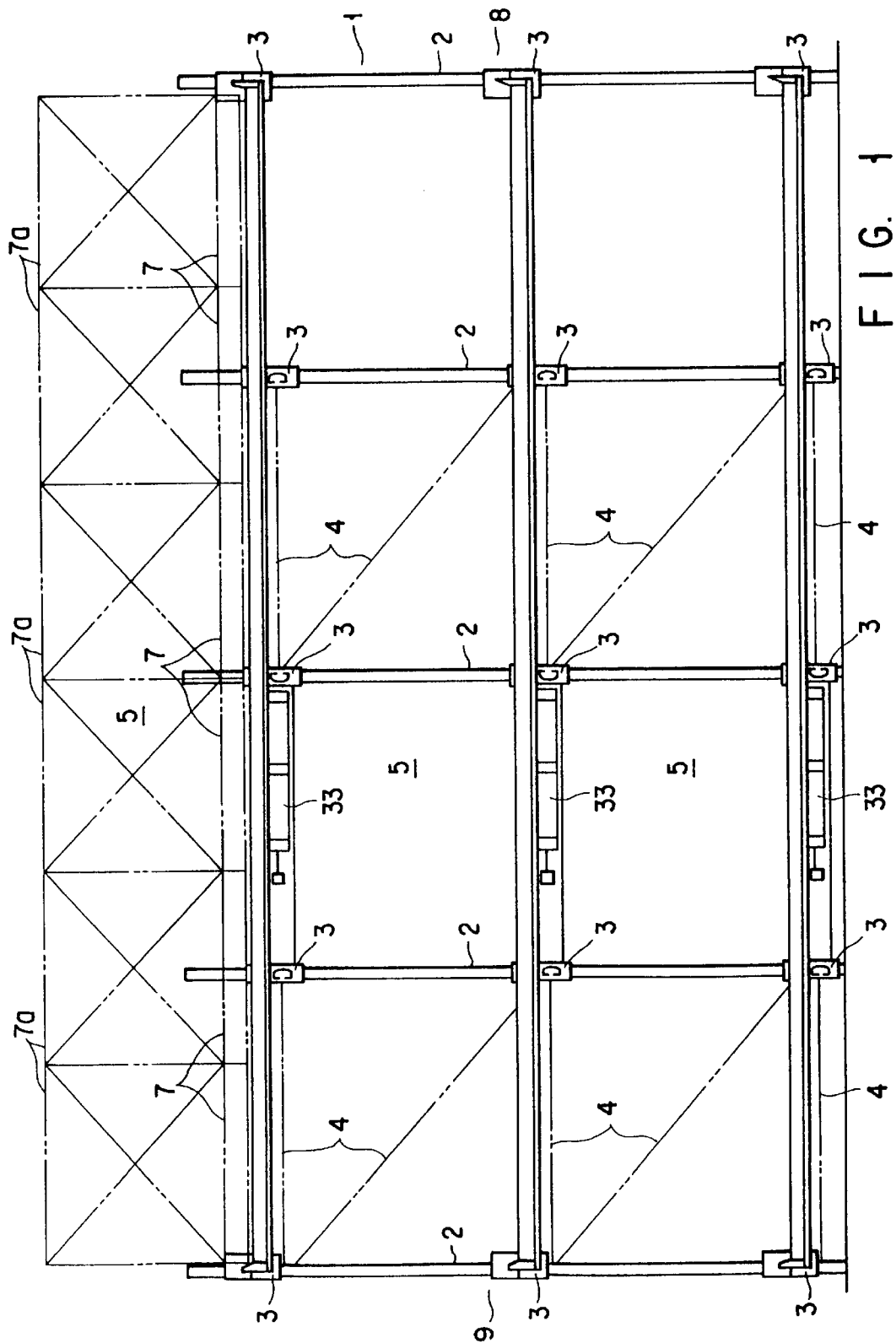
FIG. 1 is a side view showing a first preferred embodiment of a horizontal conveying apparatus for a pallet according to the present invention, explaining the entire structure of a horizontal flow-through rack.
Figure 2:
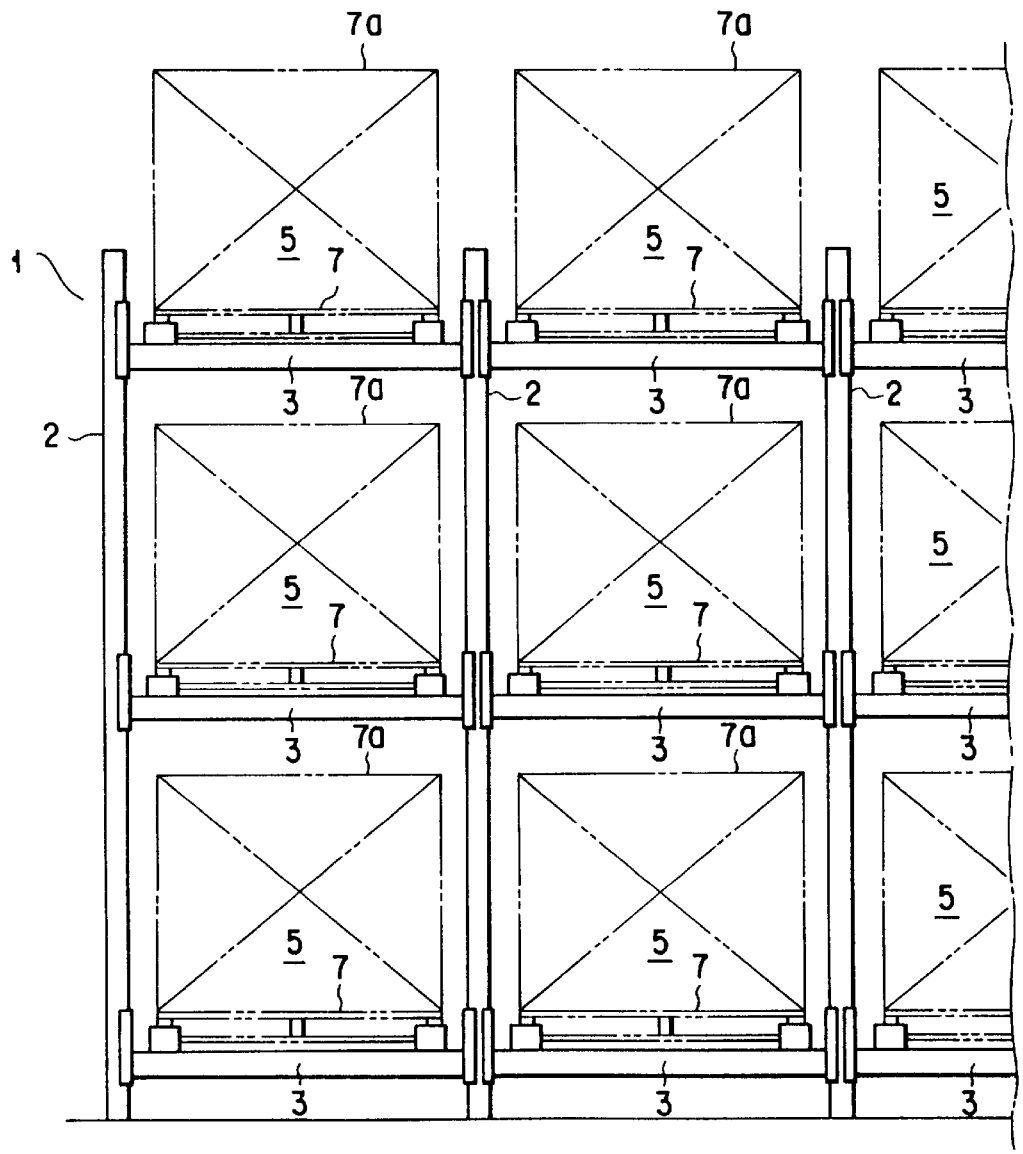
FIG. 2 is a front view showing one frontage surface of the horizontal flow-through rack in the preferred embodiment.

In the following description, the preferred embodiments of the present invention will be specifically explained with reference to the drawings. First, FIG. 1 is a side view of a horizontal flow-through rack 1. FIG. 2 is a front view showing one shelf frontage surface of the horizontal flow-through rack 1, with a part thereof omitted. In this horizontal flow-through rack 1, a plurality of columns 2 is arranged so as to stand in rows in the longitudinal direction (i.e., in the widthwise direction of FIG. 1) and in the lateral direction (i.e., in the widthwise direction of FIG. 2).

These columns 2 are connected with each other in the lateral direction by a plurality of lateral beams 3 oriented in the lateral direction. The plurality of lateral beams 3 is provided in several stages in the vertical direction of the columns 2. The columns 2 connected in the lateral direction by the lateral beams 3 are reinforced by a plurality of braces 4 provided in the longitudinal direction of the columns 2, as shown in FIG. 1.

As shown in FIG. 2, each row 5 is formed in the space between adjacent left and right columns 2 and 2 and between adjacent upper and lower lateral beams 3 and 3 (except for each of the uppermost rows 5 which are formed in the space above the lateral beams 3 and between adjacent left and right columns 2 and 2). Each of the rows 5 is formed to be extended lengthwise in the longitudinal direction from an entrance port 8 of the horizontal flow-through rack 1 to an exit port 9 thereof. Specifically, in this horizontal flow-through rack 1, a plurality of rows 5 formed to be oriented in the longitudinal direction as described above is arranged in the vertical direction and the lateral direction, as shown in FIG. 2.

Figure 3:
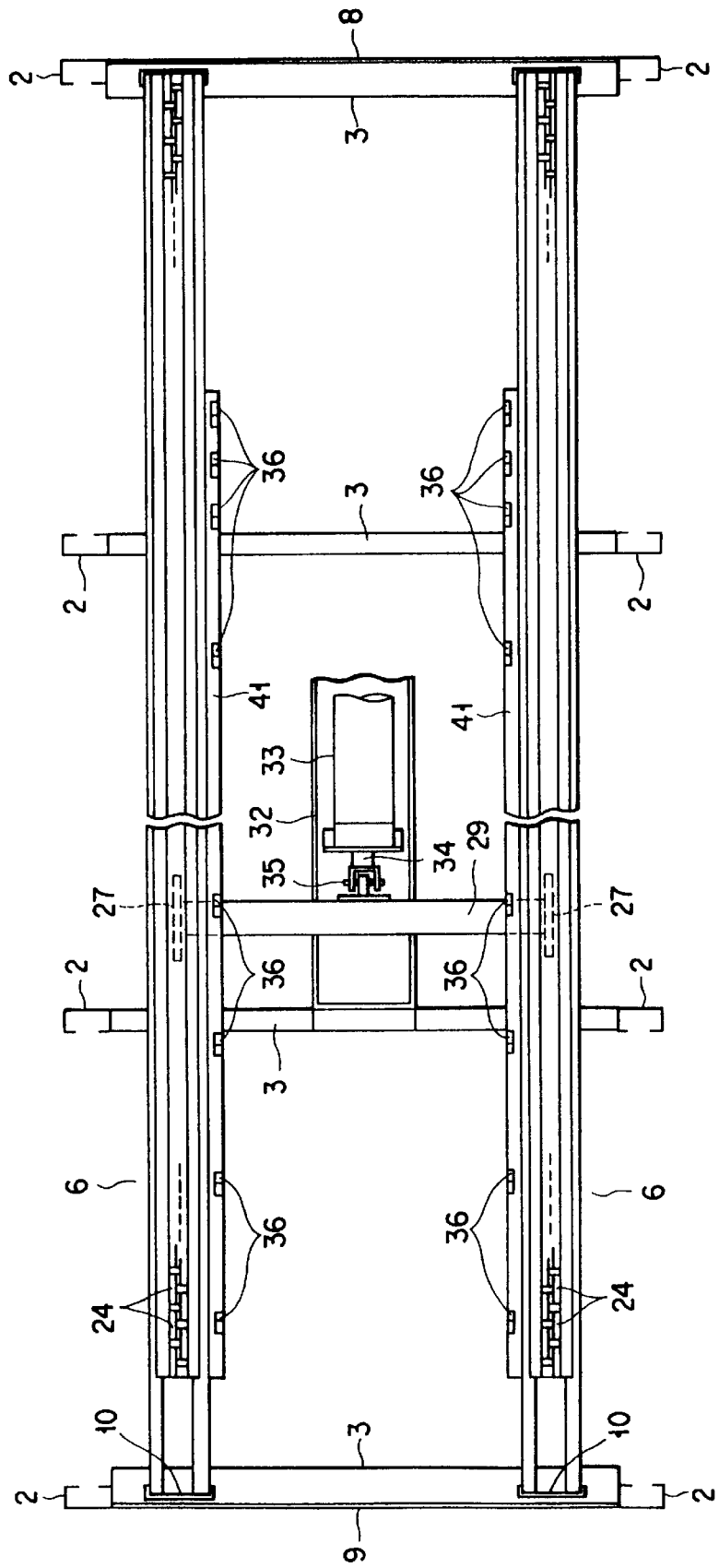
FIG. 3 is a plan view for explaining the entire structure of a row of the horizontal flow-through rack.

In the next drawing, FIG. 3 shows the detailed structure of one row 5. Note that all the rows 5 have an equal structure, and therefore, only one row 5 will be explained below as an example. Specifically, a pair of rail devices 6 and 6 is laid on the lateral beams 3 positioned below the row 5, such that the beams 3 are connected with each other in the longitudinal direction from the entrance port 8 to the exit port 9.

The rail devices 6 and 6 have a function of horizontally and intermittently conveying a pallet 7 (which will be explained as carrying a load 7a hereinafter as shown in FIGS. 1 and 2) to the exit port 9. The pallet 7 has been transported into the row 5 from the entrance port 8, as will be specifically described later. Further, the pallet 7 which is conveyed to the exit port 9 by the pair of rail devices 6 and 6 is brought into contact with and stopped by stoppers 10 and 10 respectively provided at the exit sides of the rail devices 6 and 6.

FIGS. 4A and 4B show the detailed structure of one of the rail devices 6. Note that the other rail device 6 has a structure symmetric to the one rail device 6, and therefore, detailed explanation of the other rail device 6 will be omitted herefrom. Specifically, the rail device 6 has a rail 11 fixed to the lateral beams 3, and a movable rail 16 supported so as to be movable along the lengthwise direction of the fixed rail 11.

Figure 5:
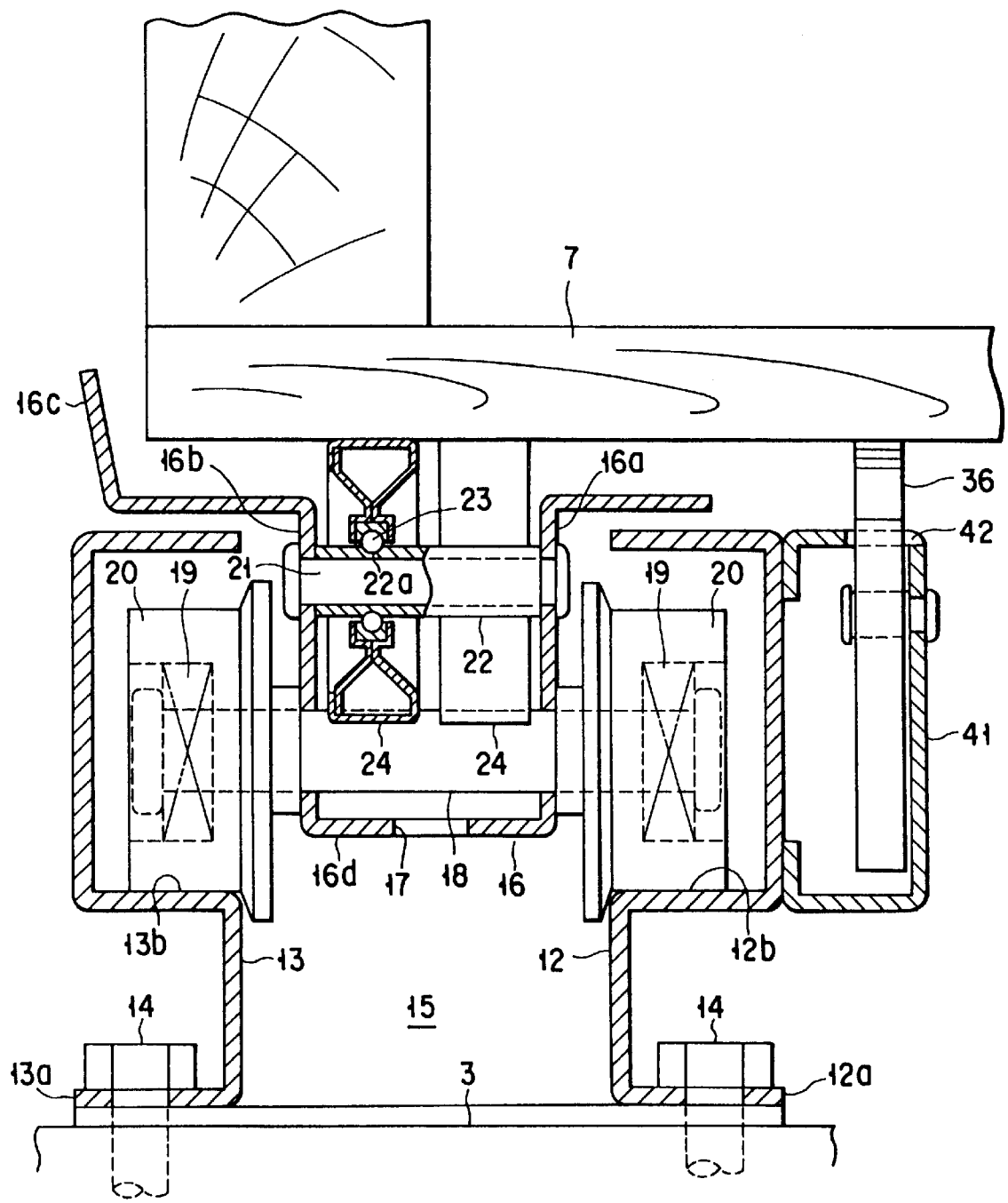
FIG. 5 is a cross-sectional view for explaining the detailed structure of a fixed rail and a movable rail in the rail device.

Of those rails, the fixed rail 11 includes rail pieces 12 and 13 formed to be symmetrical to each other on the left and right sides, as shown in FIG. 5. Each of these fixed rail pieces 12 and 13 has an upper portion like a channel facing in the lateral direction. The fixed rail pieces 12 and 13 are arranged in parallel with each other, to be extended in the horizontal direction with a predetermined distance interposed therebetween, such that the channel-like opening portions of the pieces 12 and 13 are opposed to each other.

In addition, in each of the fixed rail pieces 12 and 13, the lower part of the channel-like portion is bent at right angles in the downward direction, and the lower end portion of the channel-like portion is further bent at right angles in the outward direction, thus forming supporting portions 12a and 13a. Further, these fixed rail pieces 12 and 13 are fixed in a manner in which bolts 14 penetrating through the supporting portions 12a and 13a are tightened to the lateral beam 3.

Meanwhile, the movable rail 16 has both side surface portions 16a and 16b forming a channel-like portion open in an upward direction, and each of the top end portions of the side surface portions 16a and 16b is bent at right angles in the outward direction. A top end portion 16c of the side surface portion 16b is bent so as to extend obliquely in the upward direction to the outside. The top end portion 16c serves as a guide plate which retains the pallet 7 along the extending direction of the rail device 6 when the pallet 7 is conveyed.

In addition, a plurality of through-holes 17 is formed along the lengthwise direction in the bottom surface portion of the movable rail 16. Therefore, dust and the like which falls down on the fixed rail 11 and the movable rail 16 from the pallet 7 are exhausted out downwardly through the plurality of through-holes 17, through an opening 15 formed between the fixed rail pieces 12 and 13.

Here, as also shown in FIGS. 4A and 4B, the movable rail 16 is arranged to be shorter than the length of the fixed rail 11 by a stroke L of an air cylinder 33 which will be described later. In addition, as shown in FIG. 5, a plurality of shafts 18 is disposed at a predetermined interval along the lengthwise direction of the movable rail 16 such that the shafts 18 penetrate through lower portions of both side surface portions 16a and 16b of the movable rail 16.

Wheels/rollers 20 are rotatably supported by bearings 19 at both end portions of each shaft 18, respectively, outside both side surface portions 16a and 16b. Further, the wheels/rollers 20 move over roll surface portions 12b and 12b of the fixed rail pieces 12 and 13, thus supporting the movable rail 16 such that this rail 16 is reciprocally movable by a stroke L of the air cylinder 33, along the lengthwise direction of the fixed rail 11.

In addition, a plurality of shafts 21 is disposed at a predetermined interval along the lengthwise direction of the movable rail 16, such that the shafts 21 penetrate through upper portions of both side surface portions 16a and 16b of the movable rail 16. Load-conveying wheels/rollers 24 are rotatably supported on these shafts 21, inside both side surface portions 16a and 16b. These load-conveying wheels/rollers 24 are arranged such that the wheels/rollers 24 are alternately shifted to the left-hand side and to the right-hand side, for every shaft 21, as shown in FIGS. 4A and 4B.

A sleeve 22 in FIG. 5 is engaged on the outer circumference of each of the shafts 21. Guide grooves 22a are formed in the outer circumferences of the sleeves 22, such that the grooves 22a are alternately shifted to the left-hand side and to the right-hand side, for every shaft 21. The load-conveying wheels/rollers 24 are rotatably supported on the grooves 22a of the sleeves 22 by bearing mechanisms 23, respectively.

In addition, each load-conveying wheel/roller 24 is arranged such that an outer circumferential surface of a ring projects over the top end portions 16c of both side surface portions 16a and 16b of the movable rail 16. Therefore, the pallet 7 transported into the row 5 from the entrance port 8 is placed on the plurality of load-conveying wheels/rollers 24 supported by each movable rail 16 of the pair of rail devices 6 and 6.

Figure 6:
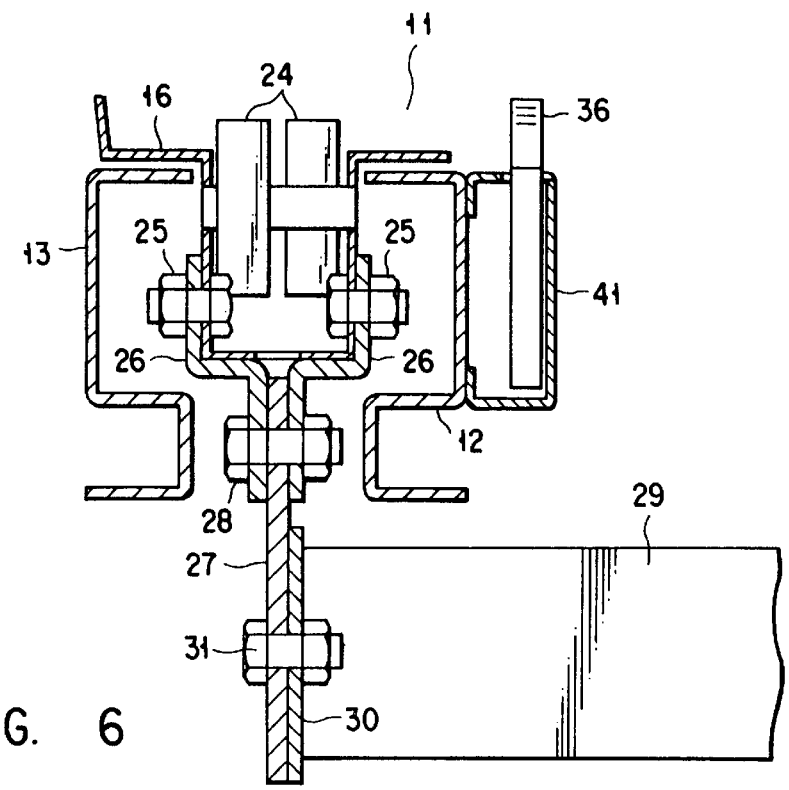
FIG. 6 is a cross-sectional view for explaining the installation structure between the movable rail and a connection rod in the rail device.
Figure 7:
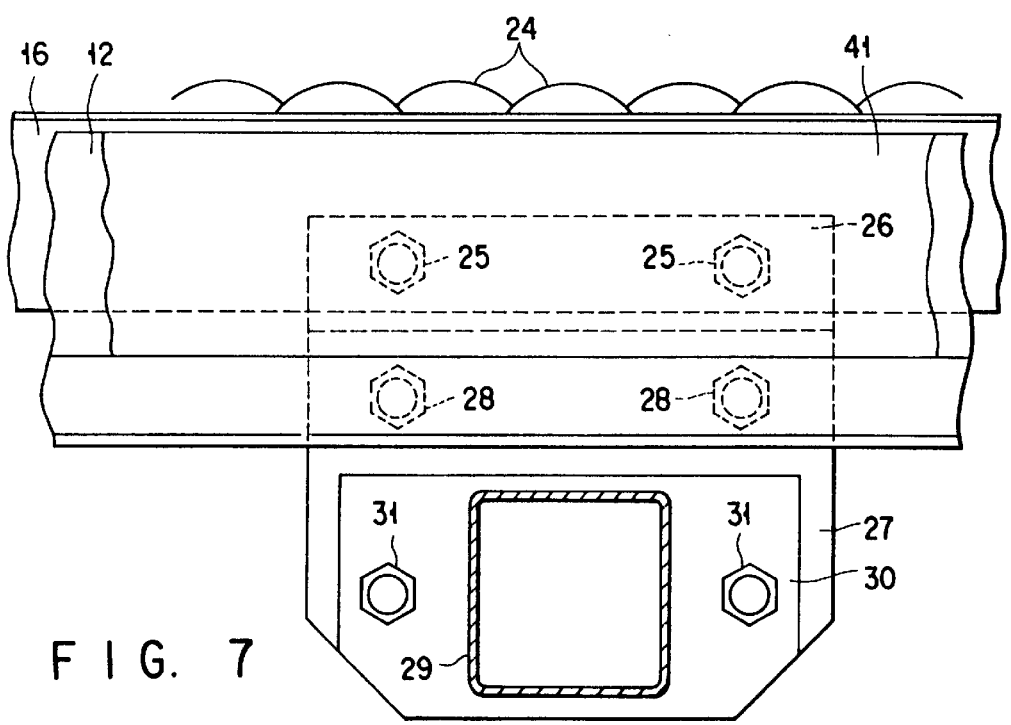
FIG. 7 is a side view for explaining the installation structure between the movable rail and a connection rod in the rail device.

Further, as shown in FIGS. 6 and 7, upper end portions of mounting plates 26 and 26 are respectively attached by bolt nuts 25 and 25, to predetermined positions of the side surface portions 16a and 16b of the movable rail 16. Lower end portions of these mounting plates 26 and 26 are bent along the sides of the movable rail 16 and further are projected downwardly to be substantially parallel thereto.

An upper portion of a gusset plate 27 is inserted between projecting portions of the mounting plates 26 and 26. The mounting plates 26 and 26 and the gusset plate 27 are integrally fixed by a bolt nut 28. A mounting plate 30 is integrally fixed to a lower portion of the gusset plate 27, by a bolt nut 31, and the mounting plate 30 is provided at an end portion of a connection rod 29 oriented in the direction bridging between the pair of rail devices 6 and 6.

Returning to FIG. 3 and FIGS. 4A and 4B, the air cylinder 33 as described before is provided at a substantially central portion between the pair of rail devices 6 and 6. The air cylinder 33 is supported by a cylinder support member 32 provided between adjacent lateral beams 3 and 3. The air cylinder 33 is arranged such that a piston rod 34 is reciprocally moved by the stroke L as described above, along the lengthwise direction of the pair of rail devices 6 and 6.

Further, the top end portion of the piston rod 34 is connected to a substantially central portion of the connection rod 29 by a coupling member 35. Therefore, when the piston rod 34 is reciprocally moved by the stroke L, respective movable rails 16 of the pair of rail devices 6 and 6 are all reciprocally moved in linkage with the piston rod 34. Note that the stroke L of the piston rod 34 is set to, for example, a value equal to or slightly greater than ¼ of the dimension of the pallet 7 in the conveying direction thereof.

Here in FIGS. 4A and 4B, a support frame 41 is fixed along the lengthwise direction to one fixed rail piece 12. The support frame 41 extends to the vicinity of the exit port 9 from a position spaced from the entrance port 8 of FIG. 3 by a dimension of the pallet 7 in the conveying direction. Further, movement stopper pieces 36 are provided at a plurality of portions of the support frame 41, along the lengthwise direction. The movement stopper pieces 36 are arranged at shorter intervals in the vicinity of the entrance port 8 than at any other position.

These movement stopper pieces 36 allow the pallet 7 mounted on the load-conveying wheels/rollers 24 to be moved forwardly together with the movable rail 16 of FIGS. 4A and 4B when the movable rail 16 is moved from the entrance port 8 of FIG. 3 to the exit port 9. When the movable rail 16 is moved backwardly from the exit port 9 to the entrance port 8, the stopper pieces 36 are brought into contact with the bottom surface of the pallet 7 mounted on the load-conveying wheels/rollers 24, thereby preventing reverse movement of the pallet 7.

Figures 8, 9:
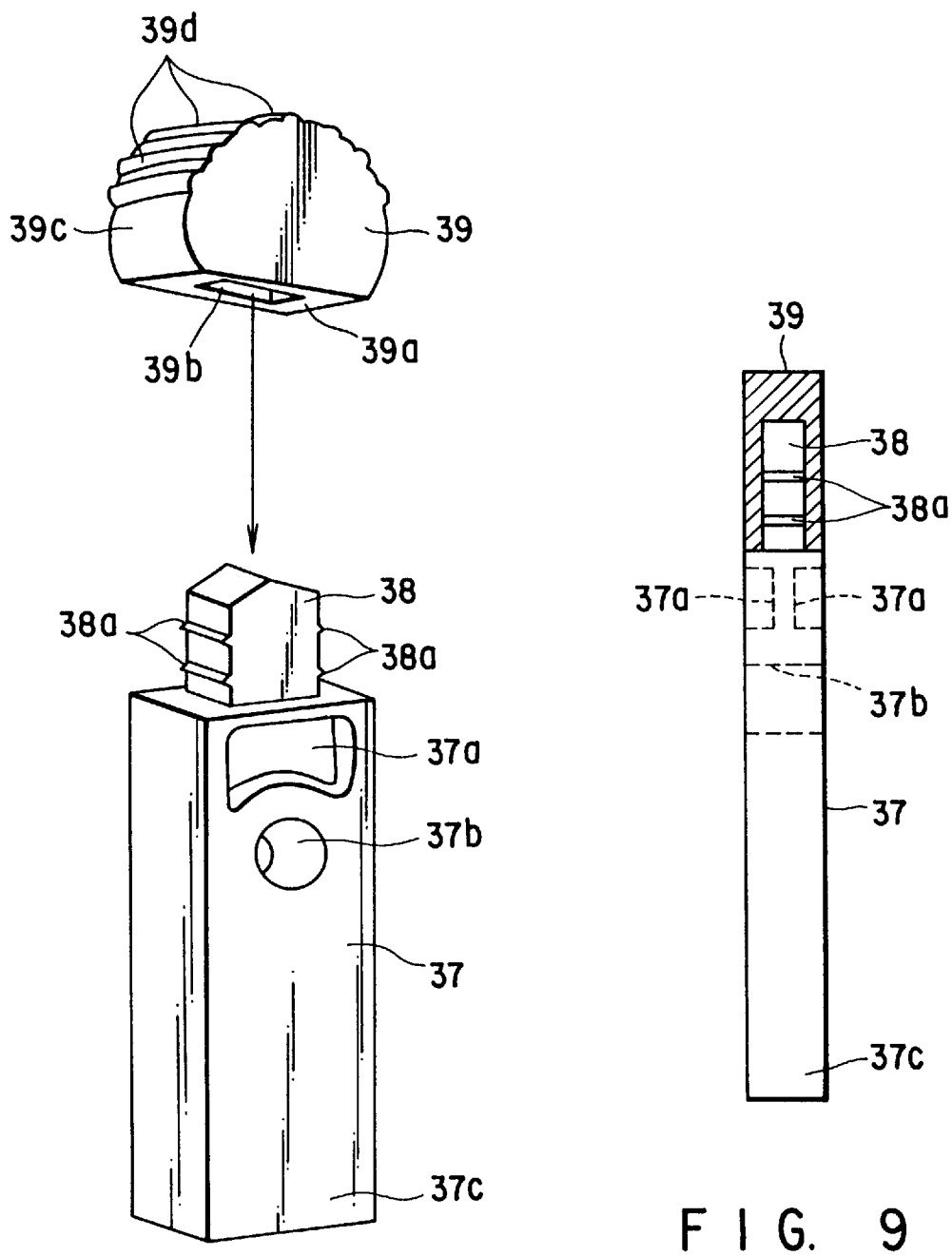
FIG. 8 is an exploded view for explaining the detailed structure of a first movement stopper piece used in the rail device.
FIG. 9 is a cross-sectional view for explaining the detailed structure of the body of the movement stopper piece.

FIGS. 8 and 9 each show the detailed structure of the movement stopper piece 36. Note that all the movement stopper pieces 36 have the same structure. Specifically, the movement stopper piece 36 has a main body 37 made of metal material in a substantially rectangular parallele-piped shape. A top end portion 38 is formed so as to project from the upper end portion of this main body 37.

In addition, concave portions 37a are formed in upper portions of both side surfaces of the main body 37. Further, a pivot hole 37b is formed in the main body 37 below the concave portions 37a, so as to communicate with both side surfaces. Further, the lower end portion of the main body 37 serves as a weight portion 37c. The top end portion 38 of the main body 37 is engaged with a curved contact portion 39.

The curved contact portion 39 is made of elastic material such as rubber, in a substantially semi-circular shape having a thickness equal to the thickness of the main body 37. The curved contact portion 39 is integrated with the main body 37, by pressing the top end portion 38 of the main body 37 into a recessed portion 39b formed in a bottom surface 39a. Note that a plurality of stopper portions 38a is formed in the top end portion 38 of the main body 37, in order to prevent disconnection of the curved contact portion 39 therefrom. In addition, a plurality of brake projections 39d is formed on a bent surface 39c of the curved contact portion 39.

Figure 10:
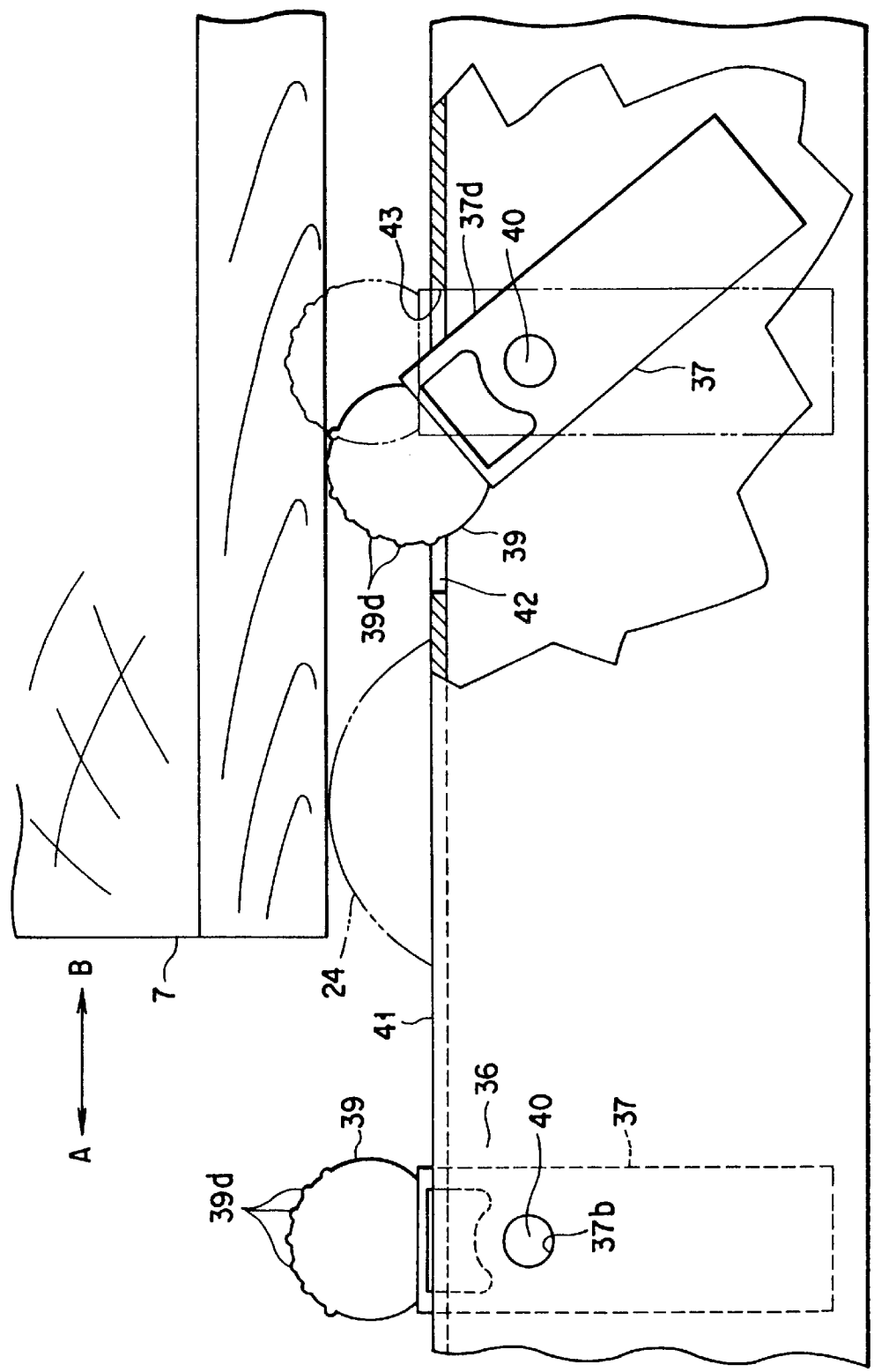
FIG. 10 is a side view for explaining the operation of the movement stopper piece in relation to the pallet.

Further, as seen in FIG. 10, the movement stopper piece 36 having the structure as described above is rotatably supported in a manner in which a pivot shaft 40 provided at a predetermined position of the support frame 41 is inserted into the pivot hole 37b. In this case on the left side of FIG. 10, the movement stopper piece 36 is arranged such that the piece 36 always stands with the curved contact portion 39 situated upwardly due to the function of the weight portion 37c of the main body 37.

In the standing condition, the curved contact portion 39 of the movement stopper piece 36 is freely inserted through an opening 42 formed in the upper end portion of the support frame 41, to be projected above an upper surface of the load-conveying wheels/rollers 24. In addition, on the movement stopper piece 36, a side edge portion 37d of the main body 37 is brought into contact with an end periphery 43 of the opening 42 in the support frame 41, thereby preventing rotation in the clockwise direction from the standing condition. Not that the size of the opening 42 is set so as to allow rotation of the movement stopper piece 36 in the anti-clockwise direction from the standing condition.

Therefore, since the movable rail 16 is moved forwardly with the pallet 7 mounted on the plurality of load-conveying wheels/rollers 24, the curved contact portion 39 of the movement stopper piece 36 is pressed against the bottom end surface of the pallet 7 in the moving direction thereof, thereby being rotated in the anti-clockwise direction so that the pallet 7 is moved in the direction indicated by arrow A in FIG. 10.

Thereafter, in accordance with the forward movement of the pallet 7, the movement stopper piece 36 is brought into an inclined state with the curved contact portion 39 kept in contact with the bottom surface of the pallet 7. In this state, the curved contact portion 39 is in contact with the bottom surface of the pallet 7 in the inclined condition, although this contact does not serve to brake the forward movement of the pallet 7.

Next, when the movable rail 16 is moved backwardly, the pallet 7 is almost moved together with the movable rail 16 in the direction indicated by arrow B in FIG. 10. In this state, the curved contact portion 39 of the movement stopper piece 36 is engaged with and has a friction force applied against the bottom surface of the pallet 7, so that the curved contact portion 39 serves to brake the backward movement of the pallet 7, thereby preventing such movement of the pallet 7.

Specifically, the pallet 7 is moved forwardly together with the movable rail 16 when the movable rail 16 moves forwardly. In addition, when the movable rail 16 is moved backwardly, the pallet 7 is maintained at a position to which the pallet 7 has already been moved, while only the movable rail 16 is moved backwardly. Further, every time that the movable rail 16 is reciprocally moved due to the function of the air cylinder 33, the above operation is repeated, thus intermittently conveying the pallet 7 in a horizontal direction toward the exit port 9.

FIG. 11 shows an air pressure control circuit 44 of the air cylinder 33. An air pressure source 45, for example, constituted by an air pump, an air tank, or the like, is connected with one end of a supply tube 46. The other end of the supply tube 46 is connected through a filter 47 and a pressure-reducing valve 48 to a first port 51 of five ports 50 to 54 provided for a 5-port 2-position electro-magnetic switch valve 49.

The port 54 of the electromagnetic switch valve 49 is connected through a supply exhaust tube 55 to a cylinder chamber 57 of the air cylinder 33 in the exit port side. In addition, the port 53 of the electro-magnetic switch valve 49 is connected to a cylinder chamber 58 through a supply exhaust tube 56. Note that the supply exhaust tubes 55 and 56 are respectively equipped with flow-adjusting valves 59 and 60 with check valves.

Further, the electro-magnetic switch valve 49 is controlled by a control computer 61. In addition, this control computer 61 also controls an entrance able indication lamp 62 provided at the entrance port 8 of the horizontal flow-through rack 1 and an exit able indication lamp 63 provided at the exit port 9. Further, the control computer 61 is connected with a start button 64, an entrance side load detection device 65, an exit side load detection device 66, and a call button 67.

The control computer 61 is operated by pushing the start button 64 into an ON-state. In this operating state, when the entrance side load detection device 65 detects that the pallet 7 is transported into the entrance port 8, the control computer 61 controls the electro-magnetic switch valve 49 so as to reciprocate the piston rod 34 of the air cylinder 33 four times after a predetermined time (e.g., three seconds) from the time of detection.

Specifically, the stroke L of the piston rod 34 of the air cylinder 33 is set to about ¼ of the dimension of the pallet 7 in the conveying direction thereof, as has been described above. Therefore, by reciprocating the piston rod 34 four times, all the pallets 7 in the row 5 including the pallet 7 just transported thereinto can be conveyed toward the exit port 9 by the dimension of the pallet 7 in the conveying direction. Further, after one cycle of this conveying operation is completed, the movable rail 16 is positioned and stopped to be close to the entrance port 8.

In addition, when the exit side load detection device 66 detects that the pallet 7 does not sit any more in the exit port 9, the control computer 61 controls the electro-magnetic switch valve 49 so as to reciprocate the piston rod 34 of the air cylinder 33 four times after a predetermined time (e.g., three seconds) from the time of detection, so that all the pallets 7 in the row 5 are conveyed toward the exit port 9 by the dimension of the pallet 7 in the conveying direction.

Further, when the call button 67 is pushed into an ON-state, the control computer 61 controls the electro-magnetic switch valve 49 so as to reciprocate the piston rod 34 of the air cylinder 33 until the exit side load detection device 66 detects that the pallet 7 reaches the exit port 9. In this case, when the exit side load detection device 66 detects that the pallet 7 reaches the exit port 9, the control computer 61 controls the electro-magnetic switch valve 49 so as to stop the operation of the air cylinder 33.

For example, when the start button 64 is pushed into the ON-state, the entrance side load detection device 65 detects whether or not the pallet 7 sits at the entrance port 8, and the control computer 61 controls the electro-magnetic switch valve 49 if the pallet 7 indeed sits at the entrance port 8. Therefore, the compressed air from the air pressure source 45 is supplied to the exit side chamber 57 of the air cylinder 33, so that the piston rod 34 is extended.

In this state, since the flow-adjusting valve 60 with a check valve is tightened, the amount exhausted out into the air from the entrance side chamber 58 of the air cylinder 33 is restricted, so that the piston rod 34 is slowly extended toward the exit port 9.

Therefore, the movable rail 16 which is moved forwardly together with the piston rod 34 toward the exit port 9 is moved at a small acceleration. As a result of this slow pace, it is possible to allow only the movable rail 16 to be moved, with the pallet 7 on the load-conveying wheels/rollers 24 being maintained by the stopper piece 36 at its original position. In other words, the pallet 7 is moved together with the movable rail 16 toward the exit port 9 only by the forwardly extending stroke of the air cylinder 33 and not by the reversing stroke thereof.

Thereafter, the control computer 61 determines that a time required for extending the piston rod 34 of the air cylinder 33 for one stroke toward the exit port 9 has passed and that a slight additional time taking into consideration the air pressure and the variation or the like of the contraction of the flow-adjusting valve 60 has also passed. The control computer 61 then controls the electro-magnetic switch valve 49 such that the port 51 is connected with the port 53. Therefore, the compressed air from the air pressure source 45 is supplied to the entrance side chamber 58 of the air cylinder 33 so that the piston rod 34 is withdrawn.

In this state, the flow path of the flow-adjusting valve 59 is slightly tightened so that the compressed air in the exit side chamber 57 of the air cylinder 33 is rapidly discharged to the atmospheric air through the exhaust tube 55. Thus, the piston rod 34 is rapidly withdrawn toward the entrance port 8.

Therefore, the movable rail 16 is moved backwardly together with the piston rod 34 at a high acceleration. Simultaneously, the pallet 7 mounted on the load-conveying wheels/rollers 24 engages, by friction, with the curved contact portion 39 of the movement stopper pieces 36. The pallet 7 is thereby restrained at its bottom surface. The movable rail 16 is moved toward the entrance port 8. However, the pallet 7 is held by the movement stopper pieces 36.

Thereafter, when the piston rod 34 is withdrawn the farthest distance and the entrance side end portion of the movable rail 16 reaches the entrance port 8, the control computer 61 controls the electro-magnetic switch valve 49 such that the port 51 and the port 54 are connected with each other and the piston rod 34 of the air cylinder 33 is extended. Subsequently, the same operation is repeated.

This reciprocal movement of the piston rod 34 is repeated four times, and the conveying operation for one cycle is completed. Since the stroke L of the piston rod 34 is set to about ¼ of the dimension of the pallet 7, the pallet 7 in the row 5 is moved forwardly by the dimension of the pallet 7 in the conveying direction, toward the exit port 9. Note that the number of times for which the reciprocal movement is repeated may be increased to five or more, if necessary.

As has been described above, when the presence of the pallet 7 at the entrance port 8 is detected, the air cylinder 33 is reciprocally moved under control of the control computer 61, thereby automatically moving the pallets 7 in the row 5 by the dimension of one pallet 7 in the conveying direction. Specifically, a vacant space equivalent to one pallet 7 is automatically created in the entrance port 8, so that the next pallet 7 can be easily transported into the entrance port 8 by a fork lift or the like.

In addition, while the air cylinder 33 is operated, the control computer 61 does not allow the exit able indication lamp 63 to be lighted, and inhibits transportation of any pallet 7 from the exit port 9. Further, with the operation of the air cylinder 33 stopped, the control computer 61 causes the exit able indication lamp 63 to be lighted, thereby allowing the conveyance of the pallet 7 out of the exit port 9.

Further, when the call button 67 is operated with no pallets 7 sitting at the entrance port 8, the reciprocal movement of the air cylinder 33 is continued under control of the control computer 61, until the pallet 7 is detected at the exit port 9 by the exit side load detection device 66.

In addition, when the movable rail 16 is moved forwardly toward the exit port 9, the movable rail 16 is moved slowly at a low acceleration. Besides, the movement stopper pieces 36 are inclined in the direction toward the exit port 9 from their standing positions indicated by dashed lines in FIG. 10, and the curved contact portions 39 thereof do not serve to brake the forward movement of the pallet 7, so that the pallet 7 is conveyed integrally together with the movable rail 16 toward the exit port 9.

Meanwhile, when the movable rail 16 is moved backwardly toward the entrance port 8, the movable rail 16 is rapidly moved at a high acceleration. In this state, the curved contact portion 39 of the movement stopper piece 36 is set into frictional contact with the bottom surface of the pallet 7, thereby braking the backward movement of the pallet 7.

Therefore, regardless of the position where on the movable rail 16 the pallet 7 sits, the backward movement of the pallet 7 is securely prevented, so that the pallet 7 can be efficiently conveyed without waste. In this case, the curved contact portion 39 made of rubber is engaged frictionally with the bottom surface of the pallet 7, so that the bottom surface of the pallet 7 is prevented from being damaged.

In particular, the movement stopper pieces 36 are disposed at an interval smaller than the dimension of one pallet 7 in the conveying direction. Therefore, regardless of the position where the pallet 7 sits, the movement stopper pieces 36 can engage with the bottom surface of the pallet 7 when the movable rail 16 is moved backwardly. Thus, backward movement of the pallet 7 can be prevented.

Further, the pallet 7 is slowly moved forwardly together with the movable rail 16 when the rail 16 is moved forwardly, while the pallet 7 is maintained at the position to which the pallet 7 has already been moved without any slight backward movement when the movable rail 16 is moved backwardly. Therefore, it is possible to prevent the load 7a on the pallet 7 from being damaged or falling down, so that sufficient safety can be ensured for the load 7a.

In addition, there is a case where a great falling impact force is applied to the load-conveying wheels/rollers 24 when the pallet 7 is transported into the entrance port 8 by use of a fork lift (not shown). However, as shown in FIG. 3, since the movement stopper pieces 36 are not provided within the range defined by the entrance port 8 and the distance equivalent to the dimension of one pallet 7 from the entrance port 8, it is possible to prevent the movement stopper pieces 36 from being damaged.

Further, the movement stopper pieces 36 are arranged at shorter intervals in the vicinity of the entrance port 8 than at any other position. Therefore, it is possible to securely prevent backward movement of those pallets 7 which are close to the entrance port 8.

In addition, the movable rail 16 returns to its original position closer to the entrance port 8 and rests at this position, when the conveying operation for one cycle is completed. Therefore, the pallet 7 which has reached the exit port 9 is prevented from being intensely pushed further in the forward direction by a subsequent pallet 7. Specifically, the pallet 7 is not influenced by subsequent pallets 7, and therefore, the pallet 7 can be easily conveyed out of the exit port 9.

In FIGS. 8 and 9, note that the main body 37 of the movement stopper piece 36 may be made of, for example, synthetic material in a substantially box-like shape and a metal weight may be integrally embedded in the main body 37, although the main body 37 of the movement stopper piece 36 is made of metal material in the preferred embodiment shown in FIGS. 1 to 11. In addition, the main body 37 and the curved contact portion 39 which are simply mechanically engaged with each other may be completely integrated with each other by baking them together.

Figure 12:
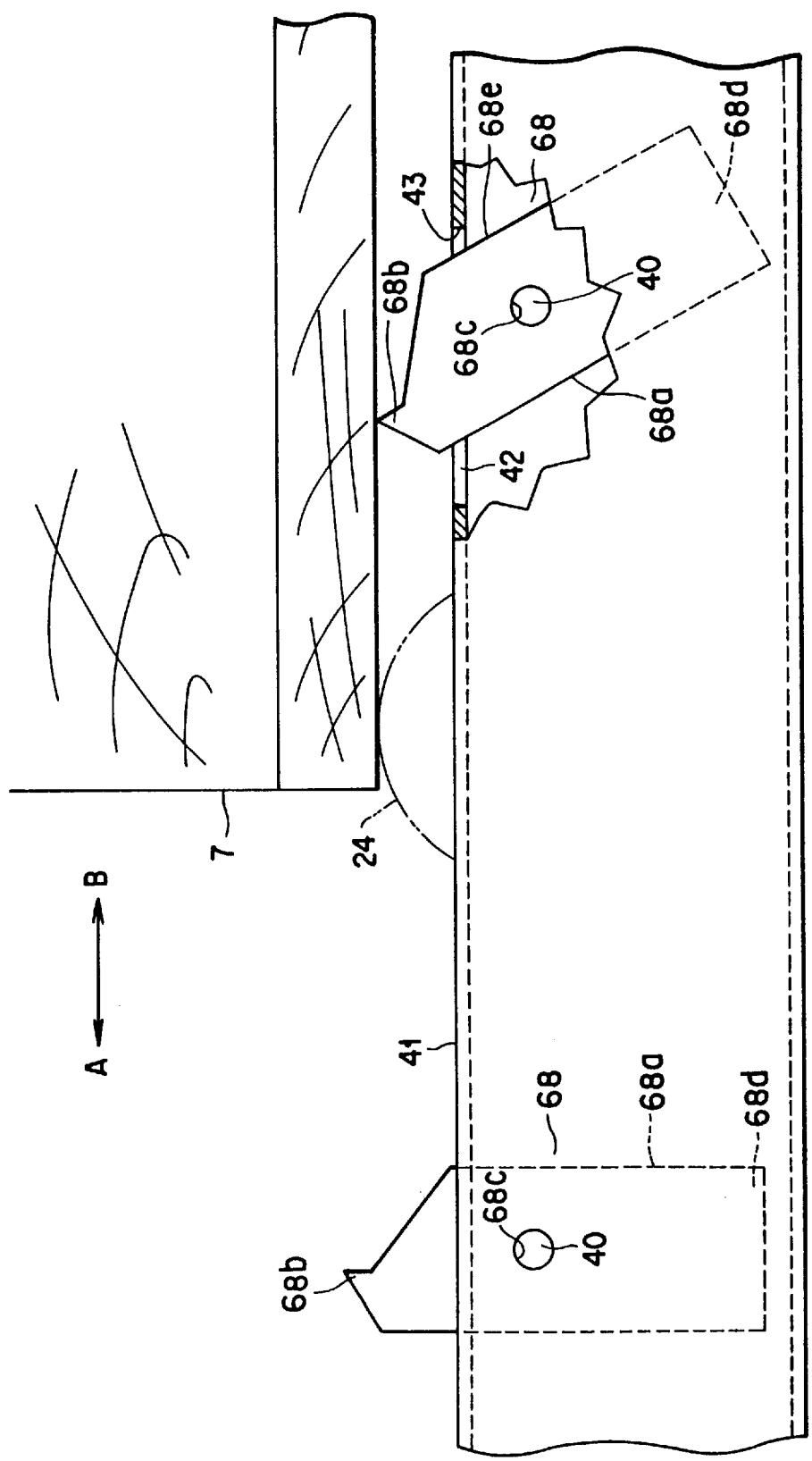
FIG. 12 is a side view for explaining a second example of the movement stopper piece in relation to the pallet.

In the next embodiment, FIG. 12 shows a modified example of the movement stopper piece 36. A movement stopper piece 68 shown in FIG. 12 comprises a main body 68a made of metal material in a substantially plate-like shape. A top sharp portion 68b is formed at the top end portion of the main body 68a. In the center portion of the main body 68a, a pivot hole 68c as described above is formed. Further, a lower end portion 68d serves as a weight.

In the movement stopper piece 68 thus constructed, the pivot shaft 40 provided at the support frame 41 is freely inserted into the pivot hole 68c, thereby rotatably supporting the stopper piece 68. In this case, the movement stopper piece 68 is arranged such that this piece 68 always stands with the top end sharp portion 68b being projected upwardly due to the function of the weight in the lower end portion 68d.

In this standing state, the top end sharp portion 68b of the movement stopper piece 68 is freely inserted into the opening 42 formed at the upper end portion of the support frame 41 and is positioned to be higher than the load-conveying wheels/rollers 24. In this movement stopper piece 68, a side edge portion 68e of the main body 68a is brought into contact with the end periphery 43 of the opening 42 of the support frame 41, thereby preventing the piece 68 from being rotated in the clockwise direction from the standing state. Note that the size of the opening 42 is set so as to allow rotation of the movement stopper piece 68 only in the anti-clockwise direction from the standing state.

Therefore, when the movable rail 16 is moved forwardly with the pallet 7 placed on the load-conveying wheels/rollers 24, thereby moving the pallet 7 in the direction indicated by arrow A in FIG. 12, the top end sharp portion 68b is pressed against the bottom surface of the pallet 7 in the moving direction, so that the movement stopper piece 68 is rotated in the anti-clockwise direction.

Thereafter, as the pallet 7 is moved forwardly, the movement stopper piece 68 is brought into an inclined state in which the top end sharp portion 68b is in contact with the bottom surface of the pallet 7. In this inclined state of the movement stopper piece 68, the top end sharp portion 68b is in contact with the bottom surface of the pallet 7, but this contact does not serve to brake the forward movement of the pallet 7.

In the next step, when the movable rail 16 is moved backwardly, the pallet 7 together with the movable rail 16 is almost moved in the direction indicated by arrow B in FIG. 12. However, in this state, the top end sharp portion 68b of the movement stopper piece 68 is engaged with and bites into the bottom surface of the pallet 7, so that the portion 68b serves to brake backward movement of the pallet 7, thereby preventing the pallet 7 from being moved backwardly.

Specifically, the pallet 7 is moved forwardly together with the movable rail 16 when the movable rail 16 is moved forwardly. In addition, the pallet 7 is maintained at the position to which the pallet 7 has already been moved, but only the movable rail 16 is moved backwardly. Further, every time that the rail 16 is reciprocally moved due to the functioning of the air cylinder 33, the above operation is repeated, thereby intermittently moving the pallet 7 in the horizontal direction toward the exit port 9.

Note that the above modified example is arranged such that the movement stopper pieces 68 are provided at a predetermined interval in the support frame 41. However, as shown in FIG. 13, the structure in which the movement stopper piece 68 is installed on the fixed rail piece 12 is not limited to this structure, and a support frame piece 69 may be used to install each of the movement stopper pieces 68 onto the fixed rail piece 12. Further, the structure shown in FIG. 13 is also applicable to the movement stopper piece 36 shown in FIG. 8.

In addition, as shown in FIG. 14, the support frame 41 may be extended to the exit port 9, and a plurality of auxiliary conveying wheels/rollers 70 may be rotatably supported on the extended portion of the support frame 41, at a height equal to the load-conveying wheels/rollers 24. In this case, the auxiliary conveying wheels/rollers 70 are provided over a range longer than the stroke L of the air cylinder 33 from the exit port 9, as shown in FIG. 4B.

If the auxiliary conveying wheels/rollers 70 of FIG. 14 are thus provided in the vicinity of the exit port 9, the pallet 7 which is in contact with the stopper 10 at the exit port 9 can be sufficiently supported by the auxiliary conveying wheels/rollers 70 even when the movable rail 16 is moved to the opposite side where the entrance port 8 is located.

Figure 15:
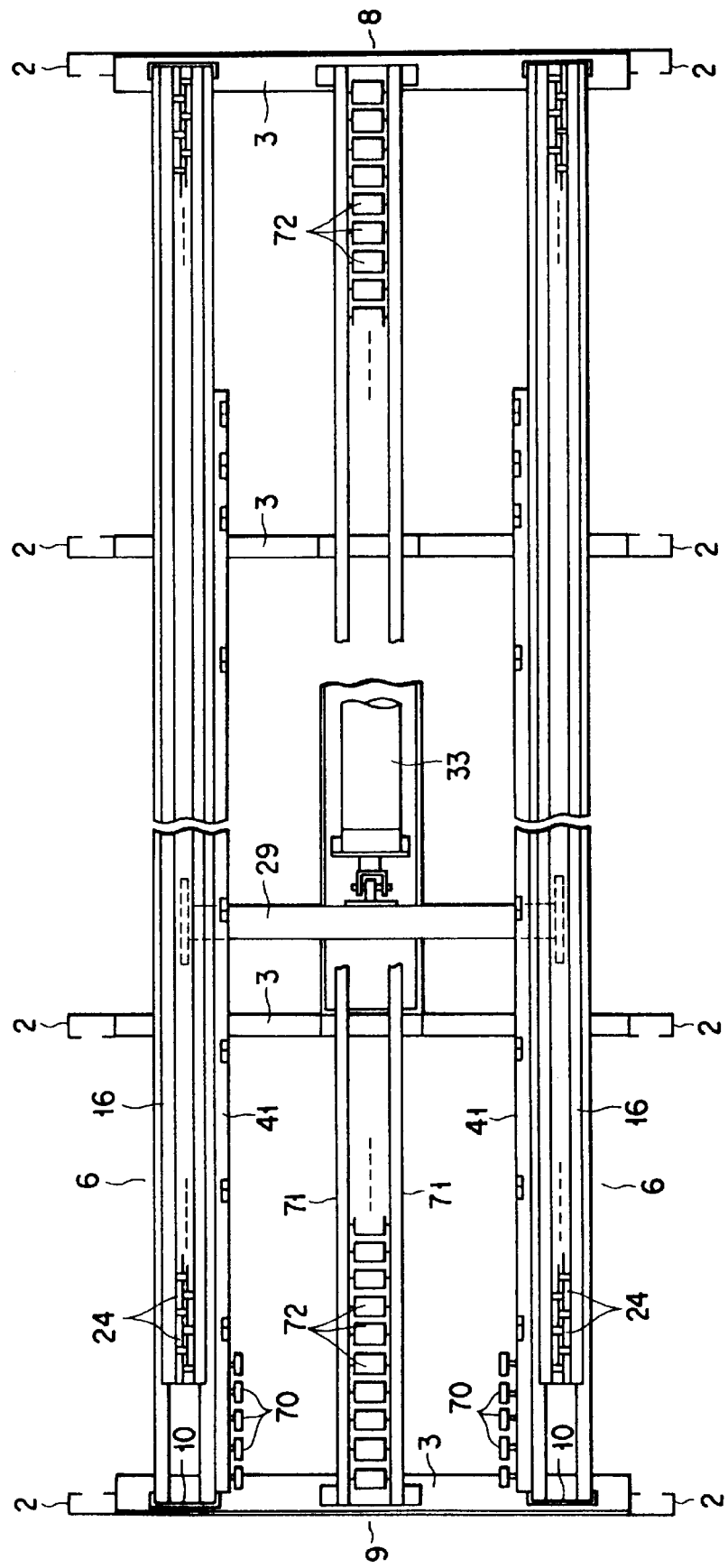
FIG. 15 is a plan view showing a state in which an intermediate rail having a support roller is provided between the pair of rail devices in the modified embodiment.

Further, as shown in FIG. 15, a pair of intermediate rails 71 and 71 is provided from the entrance port 8 to the exit port 9, in the substantially central portion between the pair of rail devices 6 and 6. The intermediate rails 71 and 71 are fixed to the lateral beams 3 such that these rails 6 and 71 are kept in parallel with each other.

Between the pair of intermediate rails 71 and 71, a plurality of support rollers 72 is rotatably supported over the entire length of the rails 71 and 71. The support rollers 72 are arranged to have a height slightly lower than the height of the load-conveying wheels/rollers 24 supported by the movable rails 16 and 16 on both sides.

According to this structure, as shown in FIG. 16, a part of the weight of the load 7a can be supported by the support rollers 72 in the case where the central portion in the widthwise direction of the pallet 7 is bent downwardly when the load 7a mounted on the pallet 7 is very heavy. Therefore, it is possible always to apply a proper load to the fixed rail 11, the movable rail 16, and the load-conveying wheels/rollers 24.

Note that the present invention is not limited to the above embodiments, but may be variously modified in practical use without deviating from the subject matter claimed hereinafter.

What is claimed is:

1. A horizontal convey apparatus for a distribution pallet, comprising:

a first fixed rail including first channel-like openings and a pair of rail members which horizontally extend in parallel between an entrance port and an exit port and which are fixed in such a manner that the first channel-like openings are opposed to each other;

a first movable rail extending between the entrance port and the exit port and arranged between the rail members of the first fixed rail and including an upwardly directed channel-like opening, said first movable rail being provided with (i) a plurality of first rolling wheels which are rotatably supported outside of the first movable rail, said first rolling wheels rolling along the first channel-like openings of the rail members of the first fixed rail and being supported in such a manner as to be reciprocatable along the first fixed rail, and (ii) a plurality of first load conveying wheels arranged inside of the first movable rail and rotatably supported in such a manner that each of the first load conveying wheels includes a part upwardly projected more than the first channel-like openings, said first load conveying wheels being adapted to hold one of right and left sides of the distribution pallet;

a second fixed rail spaced from the first fixed rail by a distance corresponding to a widthwise dimension of the distribution pallet and including second channel-like openings and a pair of rail members which horizontally extend in parallel between the entrance port and the exit port and which are fixed in such a manner that the second channel-like openings are opposed to each other;

a second movable rail extending between the entrance port and the exit port and arranged between the rail members of the second fixed rail and including an upwardly directed channel-like opening, said second movable rail including (i) a plurality of second rolling wheels which are rotatably supported outside of the second movable rail, said second rolling wheels rolling along the second channel-like openings of the rail members of the second fixed rail and being supported in such a manner as to be reciprocatable along the second fixed rail, and (ii) a plurality of second load conveying wheels arranged inside of the second movable rail and rotatably supported in such a manner that each of the second load conveying wheels includes a part upwardly projected more than the second channel-like openings, said second load conveying wheels being adapted to hold another one of the right and left sides of the distribution pallet;

coupling means including a first portion which extends downwardly from a bottom face of the first movable rail and is located between the rail members of the first fixed rail, a second portion which extends downwardly from a bottom face of the second movable rail and located between the rail members of the second fixed rail, and a third portion for coupling the first portion and the second portion together;

reciprocal drive means, coupled to the third portion of the coupling means, for reciprocating the first and second movable rails as one body for a predetermined distance along the first and second fixed rails, said reciprocal drive means being operated on the basis of supply and exhaustion of compressed air; and a plurality of load reverse movement stopper pieces arranged along those rail members of the first and second fixed rails which are located inwardly, said load reverse movement stopper pieces engaging with a bottom face of the distribution pallet and thereby holding the distribution pallet when the first and second movable rails are moving from the exit portion to the entrance port;

each of said load reverse movement stopper pieces including:

a main body rotatably supported by those rail members of the first and second fixed rails which are located inwardly;

a curved engagement portion attached to one end of the main body, having a plurality of projections which are formed of an elastic material to be integral therewith, and being engageable with the bottom face of the distribution pallet;

a weight portion provided for another end of the main body; and rotation braking means for allowing the engagement portion to rotate in a direction approaching the exit port in a state where the main body permits the engagement portion to be raised due to action of the weight portion, and for preventing the engagement portion from rotating in a direction approaching the entrance port, wherein:

when the first and second movable rails are moving from the entrance port to the exit port, the engagement portion is pushed by the distribution pallet mounted on the first and second load conveying wheels, and is rotated from a raised state into a declined state in which the engagement portion does not brake the distribution pallet, and when the first and second movable rails are moving from the exit port to the entrance port, the engagement portion in the declined state engages with the bottom face of the distribution pallet and thus brakes the distribution pallet that is moving towards the entrance port.

2. The horizontal convey apparatus for a pallet, according to claim 1, wherein the movement stopper pieces are disposed at an interval smaller than the size of the pallet in a conveying direction.

3. The horizontal convey apparatus for a pallet, according to claim 1, wherein the movement stopper pieces are arranged at shorter intervals in the vicinity of the entrance port than at any other position.

4. The horizontal convey apparatus for a pallet, according to claim 1, wherein the movement stopper pieces are not disposed within a range equivalent to the size of the pallet in the conveying direction from the entrance port.

5. The horizontal convey apparatus for a pallet, according to claim 1, wherein the reciprocal drive means is arranged such that a moving speed of the movable rails from the exit port to the entrance port is higher than a moving speed of the movable rails from the entrance port to the exit port.

6. The horizontal convey apparatus for a pallet, according to claim 1, wherein a movement stroke of the movable rails moved by the reciprocal drive means is set to about ¼ of the size of the pallet in the conveying direction.

7. The horizontal convey apparatus for a pallet, according to claim 1, further comprising:

entrance detection means for detecting that a pallet is conveyed into the entrance port; and entrance control means for automatically driving the reciprocal drive means such that the pallet is moved toward the exit port by a distance substantially equivalent to the size of the pallet in the conveying direction, on the basis of a detection result of the entrance detection means.

8. The horizontal convey apparatus for a pallet, according to claim 1, further comprising:

exit detection means for detecting presence or absence of the pallet at the exit port; and exit control means for controlling the reciprocal drive means in response to an external operation while the exit detection means is detecting the absence of the pallet, so as to automatically drive the movable rails until the presence of the pallet is detected by the exit detection means.

9. The horizontal convey apparatus for a pallet, according to claim 1, further comprising:

a plurality of auxiliary conveying wheels/rollers capable of being rotated with the pallet placed thereon, and provided on the fixed rails within a range equivalent to a movement stroke of the movable rails from the exit port.

10. The horizontal convey apparatus for a pallet, according to claim 1, further comprising:

an intermediate rail laid along the first and second movable rails in a central portion between the first and second movable rails; and a plurality of support rollers provided along the intermediate rail and rotatable with the pallet placed thereon;

wherein the support rollers are arranged to be lower than the load conveying wheels/rollers.

* * * * *

UNITED STATES PATENT AND TRADEMARK OFFICE
CERTIFICATE OF CORRECTION

PATENT NO. : 5,871,083
DATED : February 16, 1999
INVENTOR(S) : Yoshiro YAMAGUCHI It is certified that error appears in the above-identified patent and that said Letters Patent is hereby corrected as shown below:

On the title page, item [30], the Foreign Application Priority Data information should be deleted.

Signed and Sealed this

Thirteenth Day of July, 1999

Attest:

Attesting Officer

Q. TODD DICKINSON

Acting Commissioner of Patents and Trademarks